United States Patent
Chaudhry et al.

(10) Patent No.: US 12,020,060 B2
(45) Date of Patent: Jun. 25, 2024

(54) MANAGING PROXY VIRTUAL MACHINES

(71) Applicant: Rubrik, Inc., Palo Alto, CA (US)

(72) Inventors: Samir Rishi Chaudhry, Saratoga, CA (US); Li Ding, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 457 days.

(21) Appl. No.: 17/488,019

(22) Filed: Sep. 28, 2021

(65) Prior Publication Data
US 2023/0094008 A1    Mar. 30, 2023

(51) Int. Cl.
*G06F 9/455*    (2018.01)
*G06F 11/14*    (2006.01)

(52) U.S. Cl.
CPC ...... *G06F 9/45558* (2013.01); *G06F 11/1464* (2013.01); *G06F 11/1469* (2013.01); *G06F 2009/4557* (2013.01); *G06F 2009/45595* (2013.01); *G06F 2201/815* (2013.01)

(58) Field of Classification Search
CPC .................................................. G06F 9/45558
See application file for complete search history.

(56) References Cited

U.S. PATENT DOCUMENTS

2016/0371153 A1* 12/2016 Dornemann ........ G06F 11/1458
2020/0394110 A1* 12/2020 Ramohalli Gopala Rao ...............
                                                                G06F 16/285

* cited by examiner

*Primary Examiner* — Charlie Sun
(74) *Attorney, Agent, or Firm* — Holland & Hart LLP

(57) ABSTRACT

Techniques for managing proxy virtual machines are disclosed. In some embodiments, a computer system deploys proxy virtual machines on a data center in an intelligent way in order to optimize performance and efficiency for backing up data from and restoring data to the data center, using the topology of the data center to determine how many proxy virtual machines to deploy and on which specific hosts to deploy the proxy virtual machines. Rather than determining the number of proxy virtual machines to deploy based on a coaxing out of all of the ports on each proxy virtual machine to handle a planned quantity of backup jobs, the computer system may calculate the number of proxy virtual machines to use based on a rule that ports be left available for un-planned on-demand restore jobs.

20 Claims, 10 Drawing Sheets

MANAGING PROXY VIRTUAL MACHINES

TECHNICAL FIELD

The present disclosure relates generally to computer architecture software for a data management platform and, in some more particular aspects, to a system and method of managing proxy virtual machines.

BACKGROUND

The volume and complexity of data that is collected, analyzed and stored is increasing rapidly over time. The computer infrastructure used to handle this data is also becoming more complex, with more processing power and more portability. As a result, data management and storage are becoming increasingly, important. Significant issues of these processes include access to reliable data backup and storage, and fast data recovery in cases of failure. Other aspects include data portability across locations and platforms.

Some cloud computing platforms do not allow external systems to directly connect to the hosts on which virtual machines of the cloud computing platforms run. As a result, external data management systems are blocked from directly connecting to the hosts for data backup jobs and data restore jobs. Other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
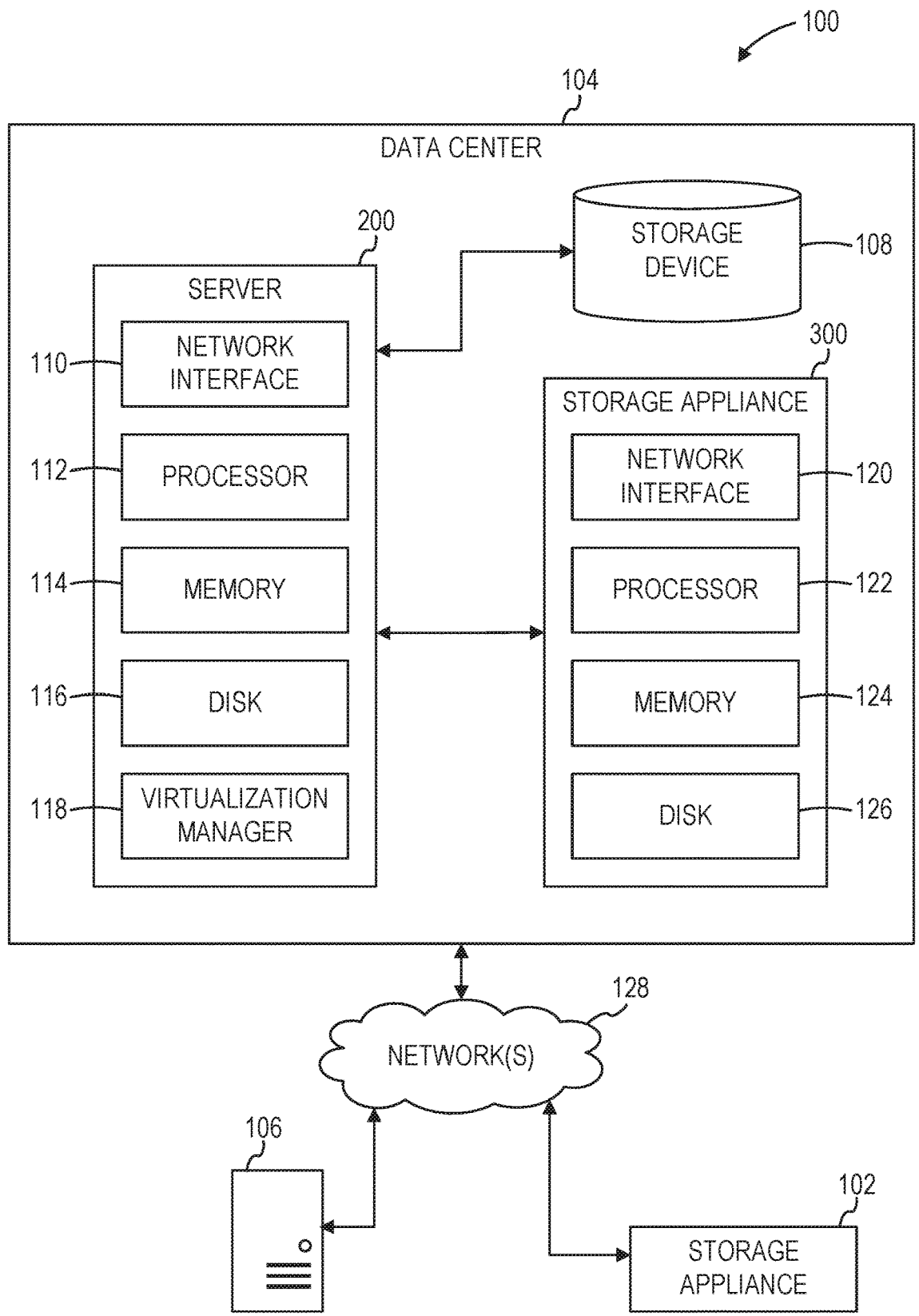
FIG. 1 depicts a networked computing environment in which the disclosed technology may be practiced, according to some example embodiments.

Example methods and systems for managing proxy virtual machines are disclosed. In the following description, for purposes of explanation, numerous specific details are set forth in order to provide a thorough understanding of example embodiments. It will be evident, however, to one skilled in the art that present embodiments can be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2021, All Rights Reserved.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to manage proxy virtual machines. The computer system may deploy proxy virtual machines on a data center in an intelligent way in order to optimize performance and efficiency for backing up data from and restoring data to the data center, using the topology of the data center to determine how many proxy virtual machines to deploy and on which specific hosts to deploy the proxy virtual machines. Furthermore, rather than determining the number of proxy virtual machines to deploy based on a coaxing out of all of the ports on each proxy virtual machine to handle a planned quantity of backup jobs, the computer system may calculate the number of proxy virtual machines to use based on a rule that ports be left available for un-planned on-demand restore jobs.

In some example embodiments, a proxy management system is configured to determine a configuration of nodes to which data is to be backed up from a data center, with the data center having a plurality of hosts and a plurality of datastores, and identify one or more datastores from the plurality of datastores from which the data is to be backed up from the data center to the configuration of nodes. The proxy management system may also select one or more hosts from the plurality of hosts based on topological information of the data center, with the topological information indicating which hosts in the plurality of hosts have access to the identified one or more datastores. For each one of the selected one or more hosts, the proxy management system may determine a corresponding quantity of backup jobs to be performed concurrently by the one of the selected one or more hosts in backing up the data to the configuration of nodes, determine a corresponding quantity of proxy virtual machines based on a total number of ports on each one of the proxy virtual machines and the corresponding quantity of backup jobs for the one of the selected one or more hosts, with the corresponding quantity of proxy virtual machines being configured to accommodate the corresponding quantity of backup jobs for the one of the selected one or more hosts using less than all of the total number of ports on each one of the proxy virtual machines, and then deploy the corresponding quantity of proxy virtual machines on the one of the selected one or more hosts, with each one of the deployed proxy virtual machines being configured to back up the data from the corresponding datastore of the selected one or more hosts to the configuration of nodes.

As a result of the features disclosed herein, the proxy management system enables a computer system to effectively and efficiently communicate with a data center that blocks external components from direct communication, configuring an optimized deployment of proxy virtual machines for performing backup jobs and restore jobs with the data center. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 depicts one embodiment of a networked computing environment 100 in which the disclosed technology may be practiced. As depicted, the networked computing environment 100 includes a data center 104, a storage appliance 102, and a computing device 106 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 104 may include one or more servers, such as server 200, in communication with one or more storage devices, such as storage device 108. The one or more servers may also be in communication with one or more storage appliances, such as storage appliance 102. The server 200, storage device 108, and storage appliance 300 may be in communication with each other via a networking fabric connecting servers and data storage units within the data center 104 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 108 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 104, may include thousands of servers and/or data storage devices in communication with each other. The one or more data storage devices 108 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 106. The storage appliance 102 may comprise a cloud-based data management system for backing up virtual machines and/or files within a virtualized infrastructure, such as virtual machines running on server 200 or files stored on server 200.

In some cases, networked computing environment 100 may provide remote access to secure applications and files stored within data center 104 from a remote computing device, such as computing device 106. The data center 104 may use an access control application to manage remote access to protected resources, such as protected applications, databases, or files located within the data center 104. To facilitate remote access to secure applications and files, a secure network connection may be established using a virtual private network (VPN). A VPN connection may allow a remote computing device, such as computing device 106, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 104. A snapshot of a virtual machine may correspond with a state of the virtual machine at a particular point-in-time. In response to a restore command from the storage device 108, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
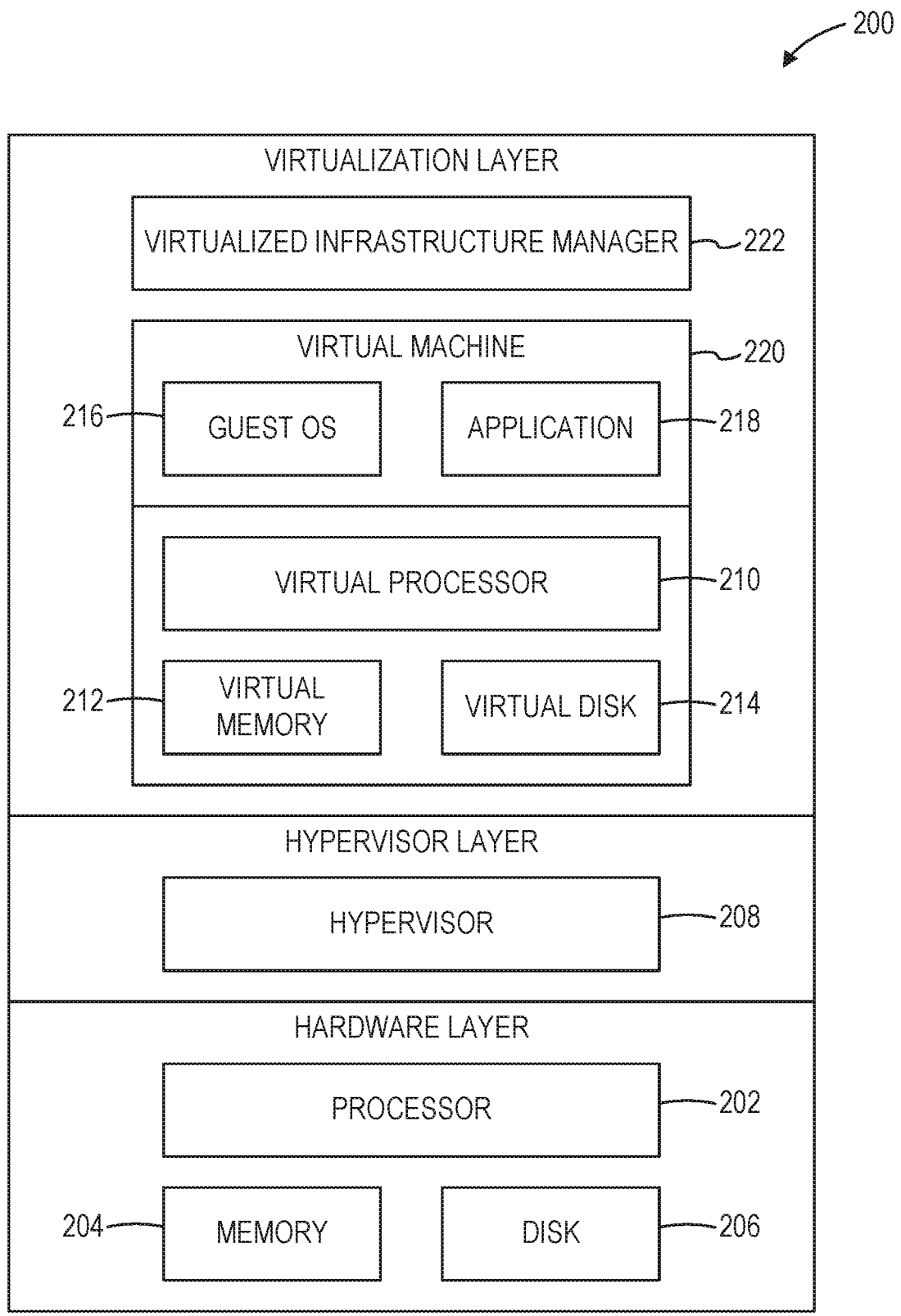
FIG. 2 depicts one embodiment of the server of FIG. 1, according to some example embodiments.

FIG. 2 depicts one embodiment of server 200 of FIG. 1. The server 200 may comprise one server out of a plurality of servers that are networked together within a data center (e.g., data center 104). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
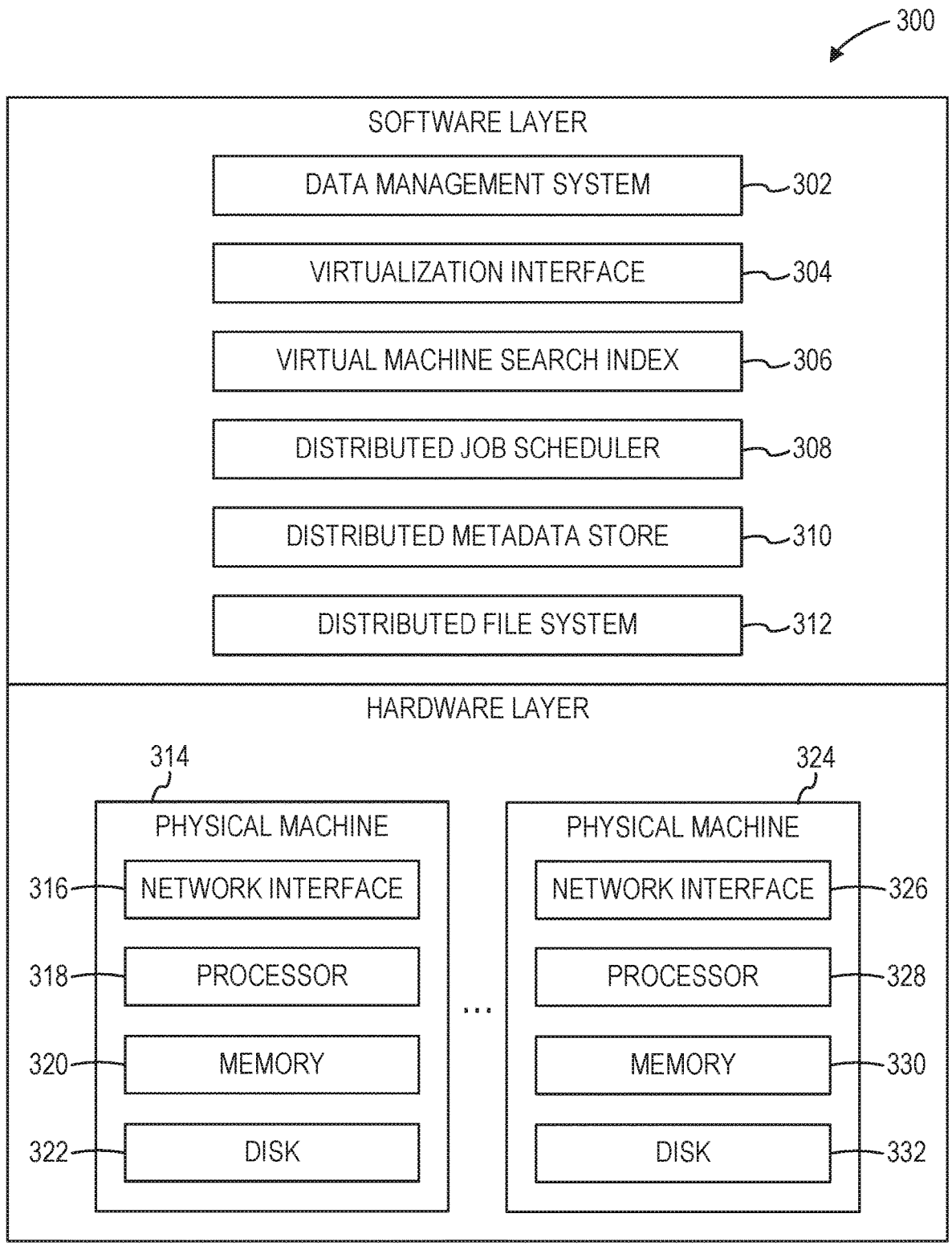
FIG. 3 depicts one embodiment of the storage appliance of FIG. 1, according to some example embodiments.

FIG. 3 depicts one embodiment of storage appliance 300 in FIG. 1, The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 31010, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 106 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
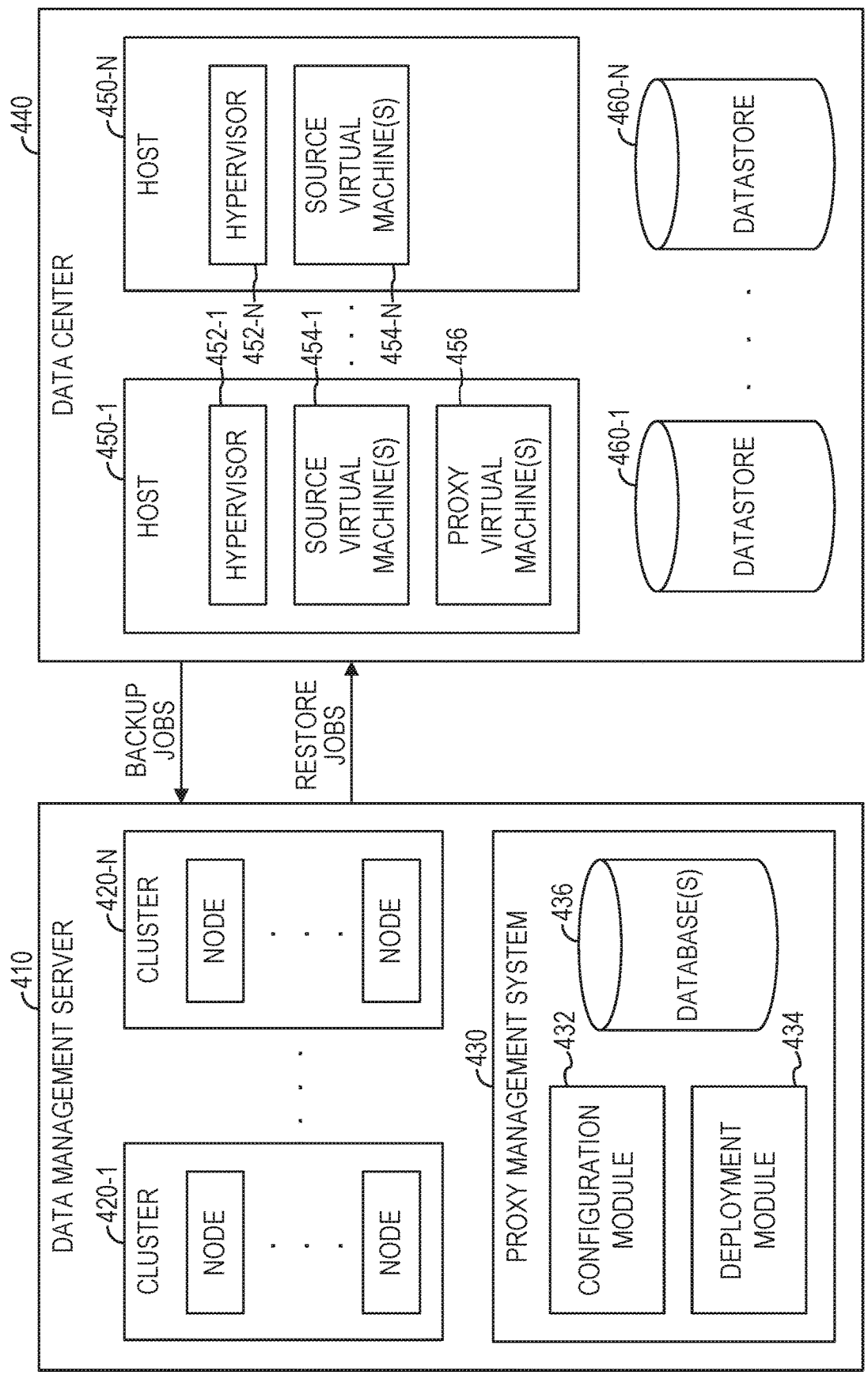
FIG. 4 is a block diagram illustrating components of a proxy management system, in accordance with some example embodiments.

FIG. 4 is a block diagram illustrating components of a proxy management system 430, in accordance with some example embodiments. In some example embodiments, the proxy management system 430 is incorporated into, integrated into, or otherwise connected to one or more of the components of the networked computing environment 100 in order to facilitate a backup of data from one of the components of the networked computing environment 100 to another one of the components of the networked computing environment 100 and a recovery of data from one of the components of the networked computing environment to another one of the components of the networked computing environment 100.

The proxy management system 430 may reside on a data management server 410, which may be incorporated into the storage appliance 300 or the storage appliance 102. In some example embodiments, the data management server 410 comprises one or more clusters of nodes 420 (e.g., cluster 420-1 to cluster 420-N), such as the clusters of nodes discussed above in the discussion of FIG. 3. The one or more clusters of nodes 420 may be configured to perform data backup jobs and data restore jobs with a data center 440. For example, the one or more clusters of nodes 420 may backup data from the data center 440, as well as restore the data to the data center 440.

The data center 440 may comprise the server 200 in FIG. 2. However, other implementations of the data center 440 are also within the scope of the present disclosure. The data center 440 may comprise a plurality of hosts 450 (e.g., host 450-1 to host 450-N). Each host 450 may comprise a corresponding hypervisor 452 and one or more corresponding source virtual machines 454. The hypervisor 452 may provide a virtual operating platform for running the source virtual machines 454. The source virtual machines 454 may run various applications and store data in one or more datastores 460 (e.g., datastore 460-1 to datastore 460-N). The data in the datastores 460 may be backed up to the data management server 410 (e.g., to the clusters of nodes 420). Additionally, the backed-up data may be restored from the data management server 410 to the datastores 460.

In some example embodiments, the data center 440 comprises a cloud-based computing platform that does not allow the data management server 410 to directly connect to the hosts 450 to back up data from the datacenter 440 or to restore data to the datacenter 440. Therefore, in order to perform data backup jobs and data restore jobs for the datacenter 440, the data management server 410 may deploy one or more proxy virtual machines 456 on one or more of the hosts 450 on the data center 440. The proxy virtual machines 456 are configured to back up data from the datastores 460 of the data center 440 to the clusters of nodes 420 on the data management server 410, as well as to restore the data from the clusters of nodes 420 back to the datastores 460.

There are technical challenges in deploying proxy virtual machines 456 on the data center 440. For example, deploying too few proxy virtual machines 456 on the data center 440 results in latency in processing backup jobs and restore jobs, whereas deploying too many proxy virtual machines 456 on the data center 440 results in a waste of resources being consumed on the data center 440. Although the demand for backup jobs may be known at the time of deploying the proxy virtual machines 456, the demand for restore jobs is not known, since restore jobs are typically requested in real-time in response to unpredictable real-world events.

The proxy management system 430 is configured to address the technical challenges discussed above. In some example embodiments, the proxy management system 430 employs one or more features of capacity planning, deployment, load balancing, monitoring, and upgrading, as will be discussed in further detail below. These features may be used for the full cycle of proxy virtual machine management in a backup and restore environment.

In some example embodiments, the proxy management system 430 comprises any combination of one or more of a configuration module 432, a deployment module 434, and one or more databases 436. The modules 432, 434 and the database(s) 436 are communicatively coupled to each other. In some example embodiments, the modules 432, 434 and the database(s) 436 reside on a single machine having a memory and at least one hardware processor. In some example embodiments, one or more of the modules 432, 434 and the database(s) 436 reside on different machines. The functionality of the modules 432 and 434 will be discussed in further detail below.

In some example embodiments, the configuration module 432 is configured to determine a configuration for deployment of the proxy virtual machines 456, such as how many proxy virtual machines 456 to deploy on the data center 440, on which hosts 450 to deploy the proxy virtual machines 456, and how many proxy virtual machines 456 to deploy on each of those hosts 450. Each proxy virtual machine 456 may comprise a number of ports from which data may be sent and received. In one example, each proxy virtual machine 456 may comprise a total of 59 ports. In order to ensure that there are enough proxy ports to support both pre-scheduled backup jobs and ad-hoc restore jobs, but that resources are not wasted with deployment of excessive proxy virtual machines 456, the configuration module 432 may use information about which nodes and datastores are to be used in backup jobs, as well as topological information of the datacenter, to determine a configuration for deployment of the proxy virtual machines 456.

In some example embodiments, the configuration module 432 is configured to determine a configuration of nodes on the data management server 410 to which data is to be backed up from the data center 440, identify one or more datastores 460 which the data is to be backed up from the data center 440 to the configuration of nodes, select one or more hosts 450 based on topological information of the data center 440, and, for each one of the selected hosts 450, determine a corresponding quantity of backup jobs to be performed concurrently by the selected hosts 450 in backing up the data to the configuration of nodes on the data management server 410. The topological information indicates which hosts 450 have access to the identified datastores 460 which the data is to be backed up from the data center 440 to the configuration of nodes.

When a user sets up a virtual machine environment in the data center 440 to be serviced by one or more of the cluster of nodes 420 of the data management server 410, the details of the service may be stored in the database 436. These details may include, but are not limited to, the configuration of nodes on the data management server 410 to which data is to be backed up from the data center 440, the datastores 460 which the data is to be backed up from the data center 440 to the configuration of nodes, the topological information of the data center 440, and the quantity of backup jobs to be performed concurrently by the selected hosts 450 in backing up the data to the configuration of nodes on the data management server 410. These details may be accessed, retrieved, and used by the configuration module 432 in the determination by the configuration module 432 of the configuration for deployment of the proxy virtual machines 456.

In some example embodiments, the configuration module 432 is configured to, for each one of the selected one or more hosts 450, determine a corresponding quantity of proxy virtual machines 456 based on a total number of ports on each one of the proxy virtual machines 456 and the corresponding quantity of backup jobs for the one of the selected one or more hosts 450. The quantity of proxy virtual machines for each selected host 450 may be configured to accommodate the corresponding quantity of backup jobs for the selected host 450 using less than all of the total number of ports on each one of the proxy virtual machines 456. For example, the configuration module 432 may calculate the number of proxy virtual machines 456 needed based on ports available per proxy virtual machine 456, but, instead of using all ports available for the calculation, the configuration module 432 may use a number that is less than the maximum available ports on each proxy virtual machine 456, thereby leaving extra ports per proxy virtual machine 456 available for restore jobs, which are requested on-demand and hard to plan capacity for.

In one simplified example, if each proxy virtual machine 456 has a total of 59 ports and the quantity of concurrent backup jobs for a host 450 is 59, the configuration module 432 may determine a deployment configuration of two proxy virtual machines 456 instead of just one proxy virtual machine 456. Although, in this example, one proxy virtual machine 456 would be sufficient to accommodate the 59 concurrent backup jobs, the configuration module 432 uses an additional proxy virtual machine 456 in order to leave ports available on both of the proxy virtual machines 456 to handle on-demand restore jobs.

In some example embodiments, the deployment module 434 is configured to, for each one of the selected one or more hosts 450, deploy the corresponding quantity of proxy virtual machines 456 on the one of the selected one or more hosts 450. Each one of the deployed proxy virtual machines 456 may be configured to back up the data from the corresponding datastore 460 of the selected one or more hosts 450 to the configuration of nodes. Each one of the deployed proxy virtual machines 456 may also be configured to restore the data from the configuration of nodes to the corresponding datastore 460 of the one of the selected one or more hosts 450.

In some example embodiments, the data management server 410 is configured to perform load balancing. For example, when a job requires a proxy virtual machine 456, the data management server 410 may select the least used proxy virtual machine 456 based on the number of ports available for on-demand use on each proxy virtual machine 456. The data management server 410 may also be configured to enable users to set network limits on in-bound and out-bound traffic from the proxy virtual machines 456 to help conserve bandwidth. Based on this input from users, the data management server 410 avoids exceeding the set network limits, such as by using rate limiting, and may distribute the available bandwidth across the running proxy virtual machines 456 on the hosts 450 as needed.

When the number of hosts 450 changes or the number of cluster nodes changes, the configuration module 432 may automatically detect the changes and recalculate the appropriate configuration of proxy virtual machines 456, resulting in either a new additional proxy virtual machine 456 being deployed in the case of more proxy virtual machines 456 being needed based on the newly-calculated configuration or a currently-deployed proxy virtual machine 456 being decommissioned or retired in the case of less proxy virtual machines 456 being needed based on the newly-calculated configuration.

In some example embodiments, the configuration module 432 is configured to detect a change in hosts that have access to the identified one or more datastores and/or a change in the configuration of nodes to which data is to be backed up from the data center. Based on this detected change, the configuration module 432 may recalculate the deployment configuration for the proxy virtual machines 456 and issue an instruction to the deployment module 434 to either deploy one or more additional proxy virtual machines 456 on one or more of the hosts 450 or decommission one or more deployed proxy virtual machines 456 on one or more of the hosts 450.

In one example, the configuration module 432 detects an additional host 450 that has access to the identified one or more datastores 460, and, in response to or otherwise based on this detection, the deployment module 434 deploys one or more additional proxy virtual machines 456 on the additional host 450. In another example, the configuration module 432 detects that one of the selected one or more hosts 450 no longer has access to the identified one or more datastores 460, and, in response to or otherwise based on this detection, the deployment module 434 decommissions or retires one or more deployed proxy virtual machines 456 on the host 450. In yet another example, the configuration module 432 detects an increase in a number of nodes in the configuration of nodes to which data is to be backed up from the data center 440, and, in response to or otherwise based on this detection, the deployment module 434 deploys one or more additional proxy virtual machines 456 on one or more of the plurality of hosts 450. In yet another example embodiment, the configuration module 432 detects a decrease in a number of nodes in the configuration of nodes to which data is to be backed up from the data center 440, and, in response to or otherwise based on this detection, the deployment module 434 decommissions or retires one or more of the deployed proxy virtual machines 456 on one or more of the hosts 450.

In some example embodiments, the proxy management system 430 is configured to monitor the deployed proxy virtual machines 456 to ensure that they are running properly, and to replace any deployed proxy virtual machines 456 that are determined to be experiencing a functional problem. For example, the configuration module 432 may periodically poll the deployed proxy virtual machines 456, and, if a proxy virtual machine 456 does not respond, it is marked as failed. If the proxy virtual machine 456 fails to respond to repeated pings from the configuration module 432, then the configuration module 432 may instruct the deployment module 434 to deploy a new proxy virtual machine 456 in the place of the failed proxy virtual machine 456. If a proxy virtual machine 456 fails one ping from the configuration module 432, but then responds to the next ping from the configuration module 432, then the configuration module 432 may move that proxy virtual machine 456 back to an OK state and no new proxy virtual machines 456 are deployed.

In some example embodiments, the configuration module 432 periodically transmits polling messages to the deployed proxy virtual machines 456, determines that one of the deployed proxy virtual machines 456 has not responded to a threshold number of the transmitted polling messages, and then instructs the deployment module 434 to deploy a replacement proxy virtual machine 456 on the corresponding host 450 to replace the unresponsive deployed proxy virtual machine 456 in response to the determination that the deployed proxy virtual machine 456 has not responded to the threshold number of the transmitted polling messages.

In some example embodiments, the proxy management system 430 is configured to automatically upgrade the proxy virtual machines 456.

Proxy virtual machines 456 may be marked by a version number, which may be stored in the database(s) 436, When a cluster of nodes 420 is upgraded, all of the deployed proxy virtual machines 456 may be checked. If the configuration module 432 detects a version mismatch between the cluster of nodes 420 and a deployed proxy virtual machine 456, then it may mark the deployed proxy virtual machine 456 for deletion and instruct the deployment module 434 to deploy a new proxy virtual machine 456 in its place. After a proxy virtual machine 456 is marked for deletion, once all of its running jobs complete, it will be deleted from its corresponding host 450, and new jobs will not select a proxy virtual machine 456 that has been marked for deletion.

In some example embodiments, the configuration module 432 determines that a version of a deployed proxy virtual machine 456 on one of the hosts 450 does not match a version of the configuration of nodes. In response to or otherwise based on this determination, the configuration module 432 may instruct the deployment module 434 to replace the deployed proxy virtual machine 456 on the host 450 with another proxy virtual machine 456 having a version that matches the version of the configuration of nodes, and the deployment module 434 may carry out this instruction.

Figure 5:
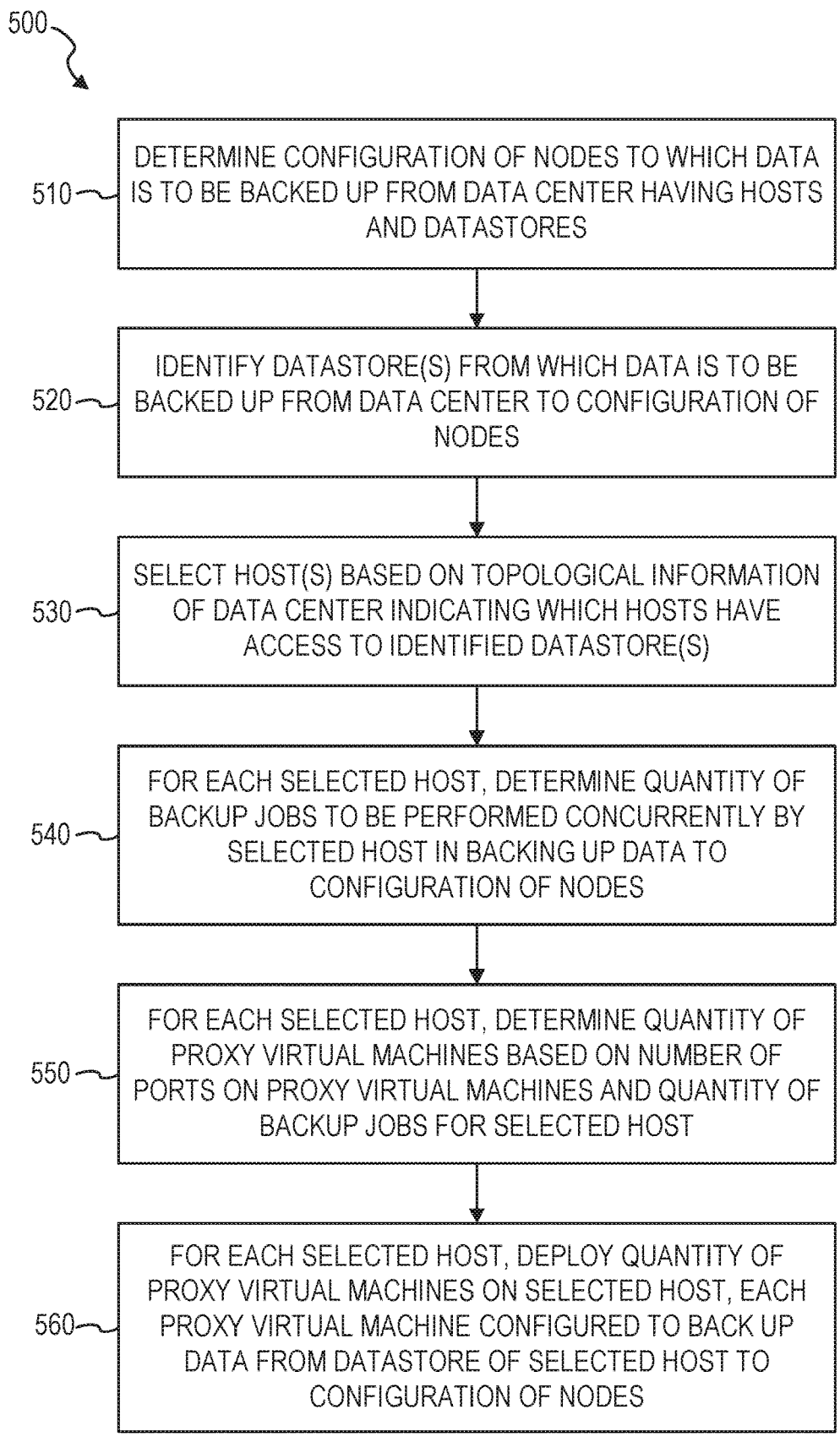
FIG. 5 is a flowchart illustrating a method of managing proxy virtual machines, in accordance with some example embodiments.

FIG. 5 is a flowchart illustrating a method 500 of managing proxy virtual machines, in accordance with some example embodiments. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the proxy management system 430 of FIG. 4.

At operation 510, the proxy management system 430 determines a configuration of nodes to which data is to be backed up from a data center. The data center may have a plurality of hosts and a plurality of datastores. At operation 520, the proxy management system 430 identifies one or more datastores from the plurality of datastores from which the data is to be backed up from the data center to the configuration of nodes. At operation 530, the proxy management system 430 selects one or more hosts from the plurality of hosts based on topological information of the data center. In some example embodiments, the topological information indicates which hosts in the plurality of hosts have access to the identified one or more datastores. At operation 540, the proxy management system 430, for each one of the selected one or more hosts, determines a corresponding quantity of backup jobs to be performed concurrently by the one of the selected one or more hosts in backing up the data to the configuration of nodes.

At operation 550, the proxy management system 430, for each one of the selected one or more hosts, determines a corresponding quantity of proxy virtual machines based on a total number of ports on each one of the proxy virtual machines and the corresponding quantity of backup jobs for the one of the selected one or more hosts. In some example embodiments, the corresponding quantity of proxy virtual machines is configured to accommodate the corresponding quantity of backup jobs for the one of the selected one or more hosts using less than all of the total number of ports on each one of the proxy virtual machines.

At operation 560, the proxy management system 430, for each one of the selected one or more hosts, deploys the corresponding quantity of proxy virtual machines on the one of the selected one or more hosts. In some example embodiments, each one of the deployed proxy virtual machines is configured to back up the data from the corresponding datastore of the selected one or more hosts to the configuration of nodes. Each one of the deployed proxy virtual machines may also be configured to restore the data from the configuration of nodes to the corresponding datastore of the one of the selected one or more hosts.

It is contemplated that any of the other features described within the present disclosure can be incorporated into the method 500.

Figure 6:
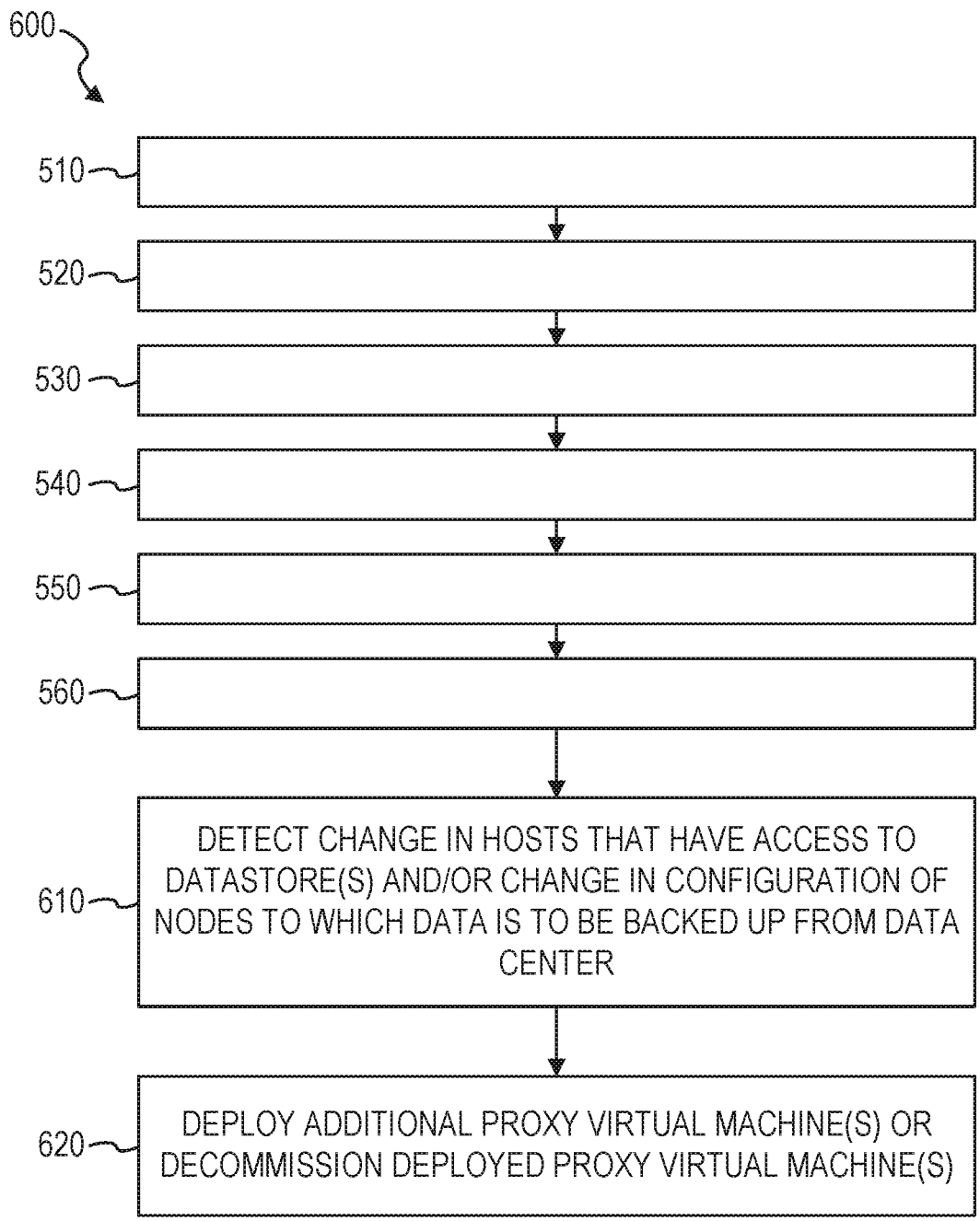
FIG. 6 is a flowchart illustrating another method of managing proxy virtual machines, in accordance with some example embodiments.

FIG. 6 is a flowchart illustrating another method 600 of managing proxy virtual machines, in accordance with some example embodiments. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by the proxy management system 430 of FIG. 4. The method 600 may include integrating operations 610 and 620 into the method 500 of FIG. 5. For example, operations 610 and 620 may be performed after the performance of the operations 510, 520, 530, 540, 550, and 560 of FIG. 5.

At operation 610, the proxy management system 430 detects a change in hosts that have access to the identified one or more datastores and/or a change in the configuration of nodes to which data is to be backed up from the data center. Then, at operation 620, the proxy management system 430 either deploys an one or more additional proxy virtual machines on one or more of the plurality of hosts or decommissions one or more deployed proxy virtual machines on one or more of the plurality of hosts.

In one example, at operation 610, the proxy management system 430 detects an additional host that has access to the identified one or more datastores, and then, at operation 620, deploys one or more additional proxy virtual machines on the additional host in response to the detecting the additional host.

In another example, at operation 610, the proxy management system 430 detects that one of the selected one or more hosts no longer has access to the identified one or more datastores, and then, at operation 620, decommissions the deployed proxy virtual machines on the one of the selected one or more hosts in response to the detecting that the one of the selected one or more hosts no longer has access to the identified one or more datastores.

In yet another example, at operation 610, the proxy management system 430 detects an increase in a number of nodes in the configuration of nodes to which data is to be backed up from the data center, and then, at operation 620, deploys one or more additional proxy virtual machines on one or more of the plurality of hosts in response to the detecting the increase in the number of nodes in the configuration of nodes.

In yet another example embodiment, at operation 610, the proxy management system 430 detects a decrease in a number of nodes in the configuration of nodes to which data is to be backed up from the data center, and then, at operation 620, decommissions one or more of the deployed proxy virtual machines on one or more of the selected one or more hosts in response to the detecting the decrease in the number of nodes in the configuration of nodes.

It is contemplated that any of the other features described within the present disclosure can be incorporated into the method 600.

Figure 7:
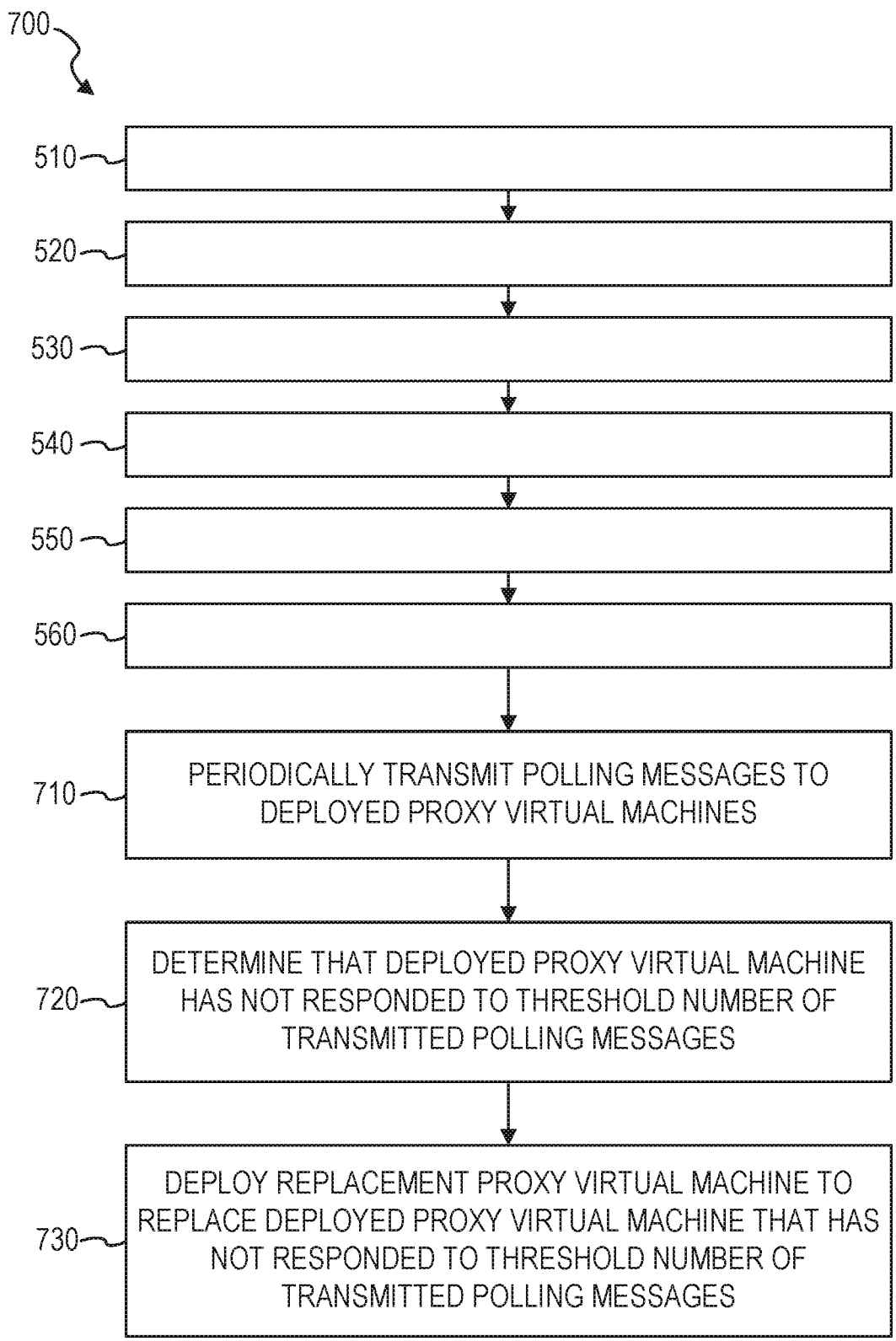
FIG. 7 is a flowchart illustrating yet another method of managing proxy virtual machines, in accordance with some example embodiments.

FIG. 7 is a flowchart illustrating yet another method 700 of managing proxy virtual machines, in accordance with some example embodiments. The method 700 can be performed by processing logic that can comprise hardware circuitry, dedicated logic, programmable logic, microcode, etc.), software (e.g., instructions run on a processing device), or a combination thereof. In one example embodiment, one or more of the operations of the method 700 are performed by the proxy management system 430 of FIG. 4. The method 700 may include integrating operations 710, 720, and 730 into the method 500 of FIG. 5. For example, operations 710, 720, and 730 may be performed after the performance of the operations 510, 520, 530, 540, 550, and 560 of FIG. 5.

At operation 710, the proxy management system 430 periodically transmits polling messages to the deployed proxy virtual machines. At operation 720, the proxy management system 430 determines that one of the deployed proxy virtual machines has not responded to a threshold number of the transmitted polling messages. At operation 730, the proxy management system 430 deploys a replacement proxy virtual machine on the one of the selected one or more hosts to replace the one of the deployed proxy virtual machines in response to the determining that the one of the deployed proxy virtual machines has not responded to the threshold number of the transmitted polling messages.

It is contemplated that any of the other features described within the present disclosure can be incorporated into the method 700.

Figure 8:
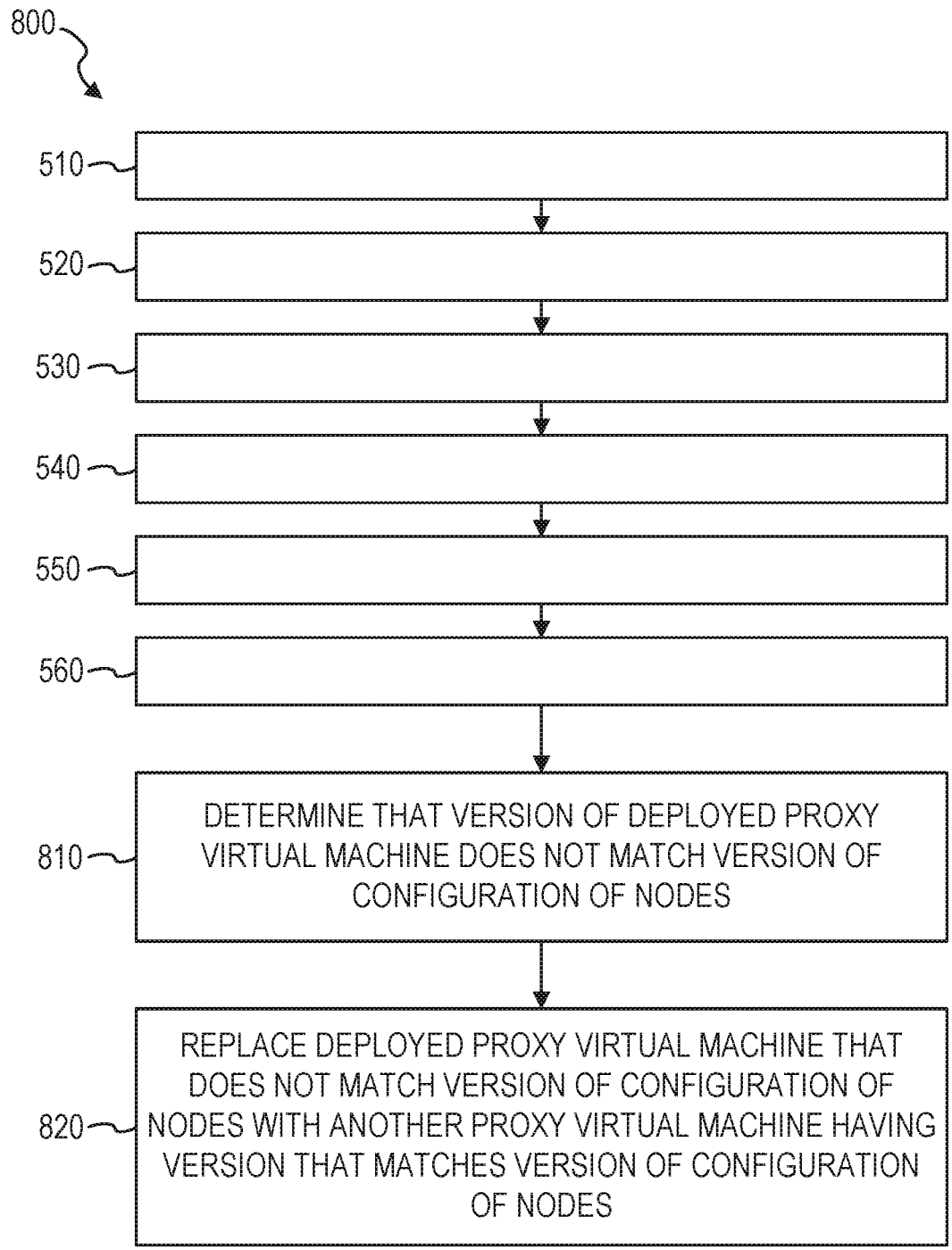
FIG. 8 is a flowchart illustrating yet another method of managing proxy virtual machines, in accordance with some example embodiments.

FIG. 8 is a flowchart illustrating yet another method 800 of managing proxy virtual machines, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the proxy management system 430 of FIG. 4. The method 800 may include integrating operations 810 and 820 into the method 500 of FIG. 5. For example, operations 810 and 820 may be performed after the performance of the operations 510, 520, 530, 540, 550, and 560 of FIG. 5.

At operation 810, the proxy management system 430 determines that a version of the one of the deployed proxy virtual machines on the one of the selected one or more hosts does not match a version of the configuration of nodes. At operation 820, the proxy management system 430, in response to the determining that the version of the one of the deployed proxy virtual machines on the one of the selected one or more hosts does not match the version of the configuration of nodes, replaces the one of the deployed proxy virtual machines on the one of the selected one or more hosts with another proxy virtual machine having a version that matches the version of the configuration of nodes.

It is contemplated that any of the other features described within the present disclosure can be incorporated into the method 800. [00(1107] In view of the disclosure above, various examples are set forth below. It should be noted that one or more features of an example; taken in isolation or combination, should be considered within the disclosure of this application.

Example 1 includes a computer-implemented method performed by a computer system having a memory and at least one hardware processor, the computer-implemented method comprising: determining a configuration of nodes to which data is to be backed up from a data center, the data center having a plurality of hosts and a plurality of datastores; identifying one or more datastores from the plurality of datastores from which the data is to be backed up from the data center to the configuration of nodes; selecting one or more hosts from the plurality of hosts based on topological information of the data center, the topological information indicating which hosts in the plurality of hosts have access to the identified one or more datastores; and for one of the selected one or more hosts: determining a corresponding quantity of backup jobs to be performed concurrently by the one of the selected one or more hosts in backing up the data to the configuration of nodes; determining a corresponding quantity of proxy virtual machines based on a number of ports on the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of a total number of ports on at least one of the proxy virtual machines; and deploying the corresponding quantity of proxy virtual machines on the one of the selected one or more hosts, wherein the deployed proxy virtual machines are configured to back up the data from the corresponding datastore of the one of the selected one or more hosts to the configuration of nodes.

Example 2 includes the computer-implemented method of example 1, wherein each one of the deployed proxy virtual machines is also configured to restore the data from the configuration of nodes to the corresponding datastore of the one of the selected one or more hosts.

Example 3 includes the computer-implemented method of example 1 or example 2, wherein: the determining the corresponding quantity of backup jobs comprises, for each one of the selected one or more hosts, determining a corresponding quantity of backup jobs to be performed concurrently by the one of the selected one or more hosts in backing up the data to the configuration of nodes; the determining the corresponding quantity of proxy virtual machines comprises, for each one of the selected one or more hosts, determining a corresponding quantity of proxy virtual machines based on a total number of ports on each one of the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of the total number of ports on each one of the proxy virtual machines; and the deploying the corresponding quantity of proxy virtual machines comprises, for each one of the selected one or more hosts, deploying the corresponding quantity of proxy virtual machines on the one of the selected one or more hosts, each one of the deployed proxy virtual machines being configured to back up the data from the corresponding datastore of the selected one or more hosts to the configuration of nodes.

Example 4 includes the computer-implemented method of any one of examples 1 to 3, further comprising: detecting an additional host that has access to the identified one or more datastores; and in response to the detecting the additional host, deploying one or more additional proxy virtual machines on the additional host.

Example 5 includes the computer-implemented method of any one of examples 1 to 4, further comprising: detecting that one of the selected one or more hosts no longer has access to the identified one or more datastores; and in response to the detecting that the one of the selected one or more hosts no longer has access to the identified one or more datastores, decommissioning the deployed proxy virtual machines on the one of the selected one or more hosts.

Example 6 includes the computer-implemented method of any one of examples 1 to 5, further comprising: detecting an increase in a number of nodes in the configuration of nodes to which data is to be backed up from the data center; and in response to the detecting the increase in the number of nodes in the configuration of nodes, deploying one or more additional proxy virtual machines on one or more of the plurality of hosts.

Example 7 includes the computer-implemented method of any one of examples 1 to 6, further comprising: detecting a decrease in a number of nodes in the configuration of nodes to which data is to be backed up from the data center; and in response to the detecting the decrease in the number of nodes in the configuration of nodes, decommissioning one or more of the deployed proxy virtual machines on one or more of the selected one or more hosts.

Example 8 includes the computer-implemented method of any one of examples 1 to 7, further comprising: periodically transmitting polling messages to the deployed proxy virtual machines; determining that one of the deployed proxy virtual machines has not responded to a threshold number of the transmitted polling messages; and deploying a replacement proxy virtual machine on the one of the selected one or more hosts to replace the one of the deployed proxy virtual machines in response to the determining that the one of the deployed proxy virtual machines has not responded to the threshold number of the transmitted polling messages.

Example 9 includes the computer-implemented method of any one of examples 1 to 8, further comprising: determining that a version of the one of the deployed proxy virtual machines on the one of the selected one or more hosts does not match a version of the configuration of nodes; and in response to the determining that the version of the one of the deployed proxy virtual machines on the one of the selected one or more hosts does not match the version of the configuration of nodes, replacing the one of the deployed proxy virtual machines on the one of the selected one or more hosts with another proxy virtual machine having a version that matches the version of the configuration of nodes.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications, and so forth described in conjunction with FIGS. 1-8 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth, A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 9:
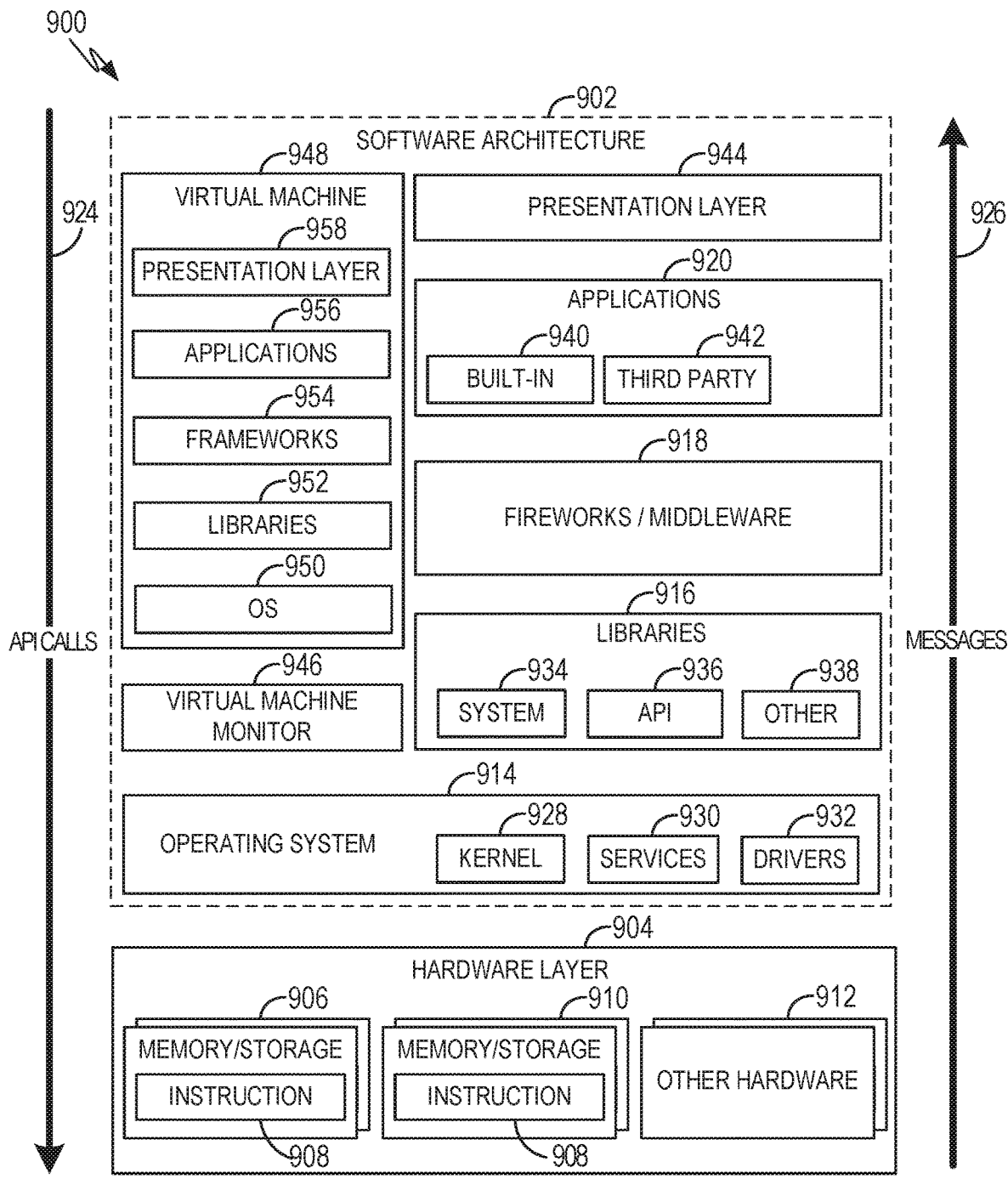
FIG. 9 is a block diagram illustrating a representative software architecture, in accordance with some example embodiments.

FIG. 9 is a block diagram 900 illustrating a representative software architecture 902, which may be used in conjunction with various hardware architectures herein described. FIG. 9 is merely a non-limiting example of a software architecture 902 and it will be appreciated that many other architectures may be implemented to facilitate the functionality described herein. The software architecture 902 may be executing on hardware such as a machine 1000 of FIG. 10 that includes, among other things, processors 910, memory/storage 930, and I/O components 950. A representative hardware layer 904 is illustrated in FIG. 9 and can represent, for example, the machine 1000 of FIG. 10, The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 900.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke application programming interface (API) calls 924 through the software stack and receive a response, returned values, and so forth, illustrated as messages 926, in response to the API calls 924. The layers illustrated are representative in nature and not all software architectures have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930, and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 or other software components/modules, some of which may be specific to a particular operating system or platform.

The applications 920 include built-in applications 940 or third-party applications 942. Examples of representative built-in applications 940 may include, but are not limited to, a contacts application, a browser application, a book reader application, a location application, a media application, a messaging application, or a game application. The third-party applications 942 may include any of the built-in applications 940 as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 942 may invoke the API calls 924 provided by the mobile operating system such as the operating system 914 to facilitate functionality described herein.

The applications 920 may utilize built-in operating system functions (e.g., kernel 928, services 930, and/or drivers 932), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (e.g., the machine of FIG. 10). A virtual machine is hosted by a host operating system (e.g., operating system 914) and typically, although not always, has a virtual machine monitor 946, which manages the operation of the virtual machine 948 as well as the interface with the host operating system (e.g., operating system 914). A software architecture executes within the virtual machine 948 such as an operating system 950, libraries 952, frameworks 954, applications 956, or presentation layer 958. These layers of software architecture executing within the virtual machine 948 can be the same as corresponding layers previously described or may be different.

Figure 10:
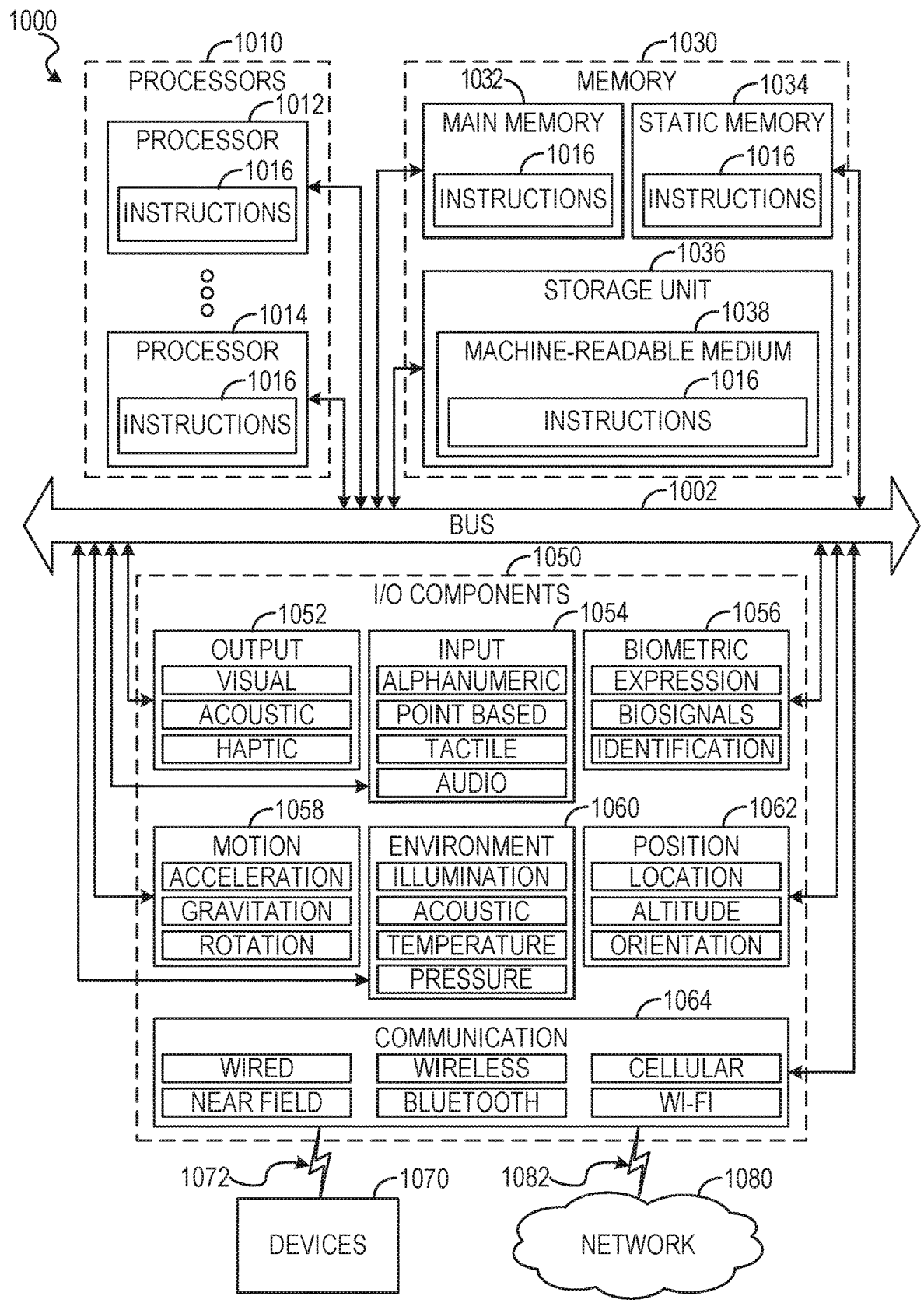
FIG. 10 is a diagrammatic representation of a machine in the form of a computer system within which a set of instructions may be executed for causing the machine to perform any one or more of the methodologies discussed herein, in accordance with some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions may cause the machine to execute the flow diagram of FIG. 10. Additionally, or alternatively, the instructions may implement any combination of one or more of the modules of FIG. 4, and so forth. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1xRTT), Evolution-Data. Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
   determining a configuration of nodes to which data is to be backed up from a data center, the data center having a plurality of hosts and a plurality of datastores;
   identifying one or more datastores from the plurality of datastores from which the data is to be backed up from the data center to the configuration of nodes;
   selecting one or more hosts from the plurality of hosts based on topological information of the data center, the topological information indicating which hosts in the plurality of hosts have access to the identified one or more datastores; and
   for one of the selected one or more hosts:
      determining a corresponding quantity of backup jobs to be performed concurrently by the one of the selected one or more hosts in backing up the data to the configuration of nodes;
      determining a corresponding quantity of proxy virtual machines based on a number of ports on the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of a total number of ports on at least one of the proxy virtual machines; and
      deploying the corresponding quantity of proxy virtual machines on the one of the selected one or more hosts, wherein the deployed proxy virtual machines are configured to back up the data from the corresponding datastore of the one of the selected one or more hosts to the configuration of nodes.

2. The computer-implemented method of claim 1, wherein each one of the deployed proxy virtual machines is also configured to restore the data from the configuration of nodes to the corresponding datastore of the one of the selected one or more hosts.

3. The computer-implemented method of claim 1, wherein:
   the determining the corresponding quantity of backup jobs comprises, for each one of the selected one or more hosts, determining a corresponding quantity of backup jobs to be performed concurrently by the one of the selected one or more hosts in backing up the data to the configuration of nodes;
   the determining the corresponding quantity of proxy virtual machines comprises, for each one of the selected one or more hosts, determining a corresponding quantity of proxy virtual machines based on a total number of ports on each one of the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of the total number of ports on each one of the proxy virtual machines; and
   the deploying the corresponding quantity of proxy virtual machines comprises, for each one of the selected one or more hosts, deploying the corresponding quantity of proxy virtual machines on the one of the selected one or more hosts, each one of the deployed proxy virtual machines being configured to back up the data from the corresponding datastore of the selected one or more hosts to the configuration of nodes.

4. The computer-implemented method of claim 3, further comprising:
   detecting an additional host that has access to the identified one or more datastores; and
   in response to the detecting the additional host, deploying one or more additional proxy virtual machines on the additional host.

5. The computer-implemented method of claim 3, further comprising:
   detecting that one of the selected one or more hosts no longer has access to the identified one or more datastores; and in response to the detecting that the one of the selected one or more hosts no longer has access to the identified one or more datastores, decommisioning the deployed proxy virtual machines on the one of the selected one or more hosts.

6. The computer-implemented method of claim 3, further comprising:
    detecting an increase in a number of nodes in the configuration of nodes to which data is to be backed up from the data center; and
    in response to the detecting the increase in the number of nodes in the configuration of nodes, deploying one or more additional proxy virtual machines on one or more of the plurality of hosts.

7. The computer-implemented method of claim 3, further comprising:
    detecting a decrease in a number of nodes in the configuration of nodes to which data is to be backed up from the data center; and
    in response to the detecting the decrease in the number of nodes in the configuration of nodes, decommissioning one or more of the deployed proxy virtual machines on one or more of the selected one or more hosts.

8. The computer-implemented method of claim 1, further comprising:
    periodically transmitting polling messages to the deployed proxy virtual machines;
    determining that one of the deployed proxy virtual machines has not responded to a threshold number of the transmitted polling messages; and
    deploying a replacement proxy virtual machine on the one of the selected one or more hosts to replace the one of the deployed proxy virtual machines in response to the determining that the one of the deployed proxy virtual machines has not responded to the threshold number of the transmitted polling messages.

9. The computer-implemented method of claim 1, further comprising:
    determining that a version of the one of the deployed proxy virtual machines on the one of the selected one or more hosts does not match a version of the configuration of nodes; and
    in response to the determining that the version of the one of the deployed proxy virtual machines on the one of the selected one or more hosts does not match the version of the configuration of nodes, replacing the one of the deployed proxy virtual machines on the one of the selected one or more hosts with another proxy virtual machine having a version that matches the version of the configuration of nodes.

10. A system of comprising:
    at least one hardware processor of a managed private cloud architecture serving an organization; and
    a non-transitory computer-readable medium storing executable instructions that, when executed, cause the at least one processor to perform operations comprising:
        determining a configuration of nodes to which data is to be backed up from a data center, the data center having a plurality of hosts and a plurality of datastores;
        identifying one or more datastores from the plurality of datastores from which the data is to be backed up from the data center to the configuration of nodes;
        selecting one or more hosts from the plurality of hosts based on topological information of the data center, the topological information indicating which hosts in the plurality of hosts have access to the identified one or more datastores; and
        for one of the selected one or more hosts:
            determining a corresponding quantity of backup jobs to be performed concurrently by the one of the selected one or more hosts in backing up the data to the configuration of nodes;
            determining a corresponding quantity of proxy virtual machines based on a number of ports on the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of a total number of ports on at least one of the proxy virtual machines; and
            deploying the corresponding quantity of proxy virtual machines on the one of the selected one or more hosts,
        wherein the deployed proxy virtual machines are configured to back up the data from the corresponding datastore of the one of the selected one or more hosts to the configuration of nodes.

11. The system of claim 10, wherein each one of the deployed proxy virtual machines is also configured to restore the data from the configuration of nodes to the corresponding datastore of the one of the selected one or more hosts.

12. The system of claim 10, wherein:
    the determining the corresponding quantity of backup jobs comprises, for each one of the selected one or more hosts, determining a corresponding quantity of backup jobs to be performed concurrently by the one of the selected one or more hosts in backing up the data to the configuration of nodes;
    the determining the corresponding quantity of proxy virtual machines comprises, for each one of the selected one or more hosts, determining a corresponding quantity of proxy virtual machines based on a total number of ports on each one of the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of the total number of ports on each one of the proxy virtual machines; and
    the deploying the corresponding quantity of proxy virtual machines comprises, for each one of the selected one or more hosts, deploying the corresponding quantity of proxy virtual machines on the one of the selected one or more hosts, each one of the deployed proxy virtual machines being configured to back up the data from the corresponding datastore of the selected one or more hosts to the configuration of nodes.

13. The system of claim 12, wherein the operations further comprise:
    detecting an additional host that has access to the identified one or more datastores; and
    in response to the detecting the additional host, deploying one or more additional proxy virtual machines on the additional host.

14. The system of claim 12, wherein the operations further comprise:

detecting that one of the selected one or more hosts no longer has access to the identified one or more datastores; and in response to the detecting that the one of the selected one or more hosts no longer has access to the identified one or more datastores, decommissioning the deployed proxy virtual machines on the one of the selected one or more hosts.

15. The system of claim 12, wherein the operations further comprise:

detecting an increase in a number of nodes in the configuration of nodes to which data is to be backed up from the data center; and in response to the detecting the increase in the number of nodes in the configuration of nodes, deploying one or more additional proxy virtual machines on one or more of the plurality of hosts.

16. The system of claim 12, wherein the operations further comprise:

detecting a decrease in a number of nodes in the configuration of nodes to which data is to be backed up from the data center; and in response to the detecting the decrease in the number of nodes in the configuration of nodes, decommissioning one or more of the deployed proxy virtual machines on one or more of the selected one or more hosts.

17. The system of claim 10, wherein the operations further comprise:

periodically transmitting polling messages to the deployed proxy virtual machines;

determining that one of the deployed proxy virtual machines has not responded to a threshold number of the transmitted polling messages; and deploying a replacement proxy virtual machine on the one of the selected one or more hosts to replace the one of the deployed proxy virtual machines in response to the determining that the one of the deployed proxy virtual machines has not responded to the threshold number of the transmitted polling messages.

18. The system of claim 10, wherein the operations further comprise:

determining that a version of the one of the deployed proxy virtual machines on the one of the selected one or more hosts does not match a version of the configuration of nodes; and in response to the determining that the version of the one of the deployed proxy virtual machines on the one of the selected one or more hosts does not match the version of the configuration of nodes; replacing the one of the deployed proxy virtual machines on the one of the selected one or more hosts with another proxy virtual machine having a version that matches the version of the configuration of nodes.

19. A non-transitory machine-readable storage medium tangibly embodying a set of instructions that, when executed by at least one hardware processor, causes the at least one processor to perform operations comprising:

determining a configuration of nodes to which data is to be backed up from a data center, the data center having a plurality of hosts and a plurality of datastores;

identifying one or more datastores from the plurality of datastores from which the data is to be backed up from the data center to the configuration of nodes;

selecting one or more hosts from the plurality of hosts based on topological information of the data center, the topological information indicating which hosts in the plurality of hosts have access to the identified one or more datastores; and for one of the selected one or more hosts:

determining a corresponding quantity of backup jobs to be performed concurrently by the one of the selected one or more hosts in backing up the data to the configuration of nodes;

determining a corresponding quantity of proxy virtual machines based on a number of ports on the proxy virtual machines and the corresponding quantity of backup jobs for the one of the selected one or more hosts, the corresponding quantity of proxy virtual machines being configured to accommodate the corresponding quantity of backup jobs for the one of the selected one or more hosts using less than all of a total number of ports on at least one of the proxy virtual machines; and deploying the corresponding quantity of proxy virtual machines on the one of the selected one or more hosts, wherein the deployed proxy virtual machines are configured to back up the data from the corresponding datastore of the one of the selected one or more hosts to the configuration of nodes.

20. The non-transitory machine-readable storage medium of claim 19, wherein each one of the deployed proxy virtual machines is also configured to restore the data from the configuration of nodes to the corresponding datastore of the one of the selected one or more hosts.

* * * * *